United States Patent
Chase et al.

(10) Patent No.: US 7,494,192 B2
(45) Date of Patent: Feb. 24, 2009

(54) VEHICLE WHEEL RIM FLANGE AND OVERLAY ASSEMBLY

(75) Inventors: Lee A. Chase, Grand Rapids, MI (US); Eldean Weidmayer, Alto, MI (US); Gregory R. Hauler, Montague, MI (US)

(73) Assignee: Lacks Industries, Inc., Grand Rapids, MI (US)

( * ) Notice: Subject to any disclaimer, the term of this patent is extended or adjusted under 35 U.S.C. 154(b) by 335 days.

(21) Appl. No.: 09/775,425

(22) Filed: Feb. 1, 2001

(65) Prior Publication Data

US 2002/0093242 A1 Jul. 18, 2002

Related U.S. Application Data

(63) Continuation-in-part of application No. 09/304,734, filed on May 4, 1999, now abandoned.

(60) Provisional application No. 60/084,378, filed on May 6, 1998.

(51) Int. Cl.
*B60B 7/06* (2006.01)
(52) U.S. Cl. .................. 301/37.43; 301/37.11
(58) Field of Classification Search .............. 301/37.42, 301/37.43, 37.101, 37.11, 37.371, 37.102
See application file for complete search history.

(56) References Cited

U.S. PATENT DOCUMENTS

| | | | |
|---|---|---|---|
| 2,361,406 A * | 10/1944 | Lyon | |
| 2,714,039 A | 7/1955 | Pouell | |
| 2,926,954 A | 3/1960 | Lyon | |
| 3,265,441 A * | 8/1966 | Baldwin | 301/37.42 |
| 3,367,720 A * | 2/1968 | Aske, Jr. | 301/37.42 |
| 3,724,905 A * | 4/1973 | Kachler | 301/37.42 |
| 3,726,566 A | 4/1973 | Beith | |
| 3,891,276 A | 6/1975 | Spisak | |
| 4,219,241 A | 8/1980 | Muller et al. | |
| 4,275,931 A | 6/1981 | Reppert | |
| 4,348,061 A | 9/1982 | Bowling | |
| 4,361,359 A | 11/1982 | Binnewies et al. | |
| 4,438,979 A | 3/1984 | Renz et al. | |
| 5,031,965 A * | 7/1991 | Buerger | 301/37.37 |
| 5,143,426 A | 9/1992 | Todd | |

(Continued)

FOREIGN PATENT DOCUMENTS

DE 28 48 790 A1 5/1980

*Primary Examiner*—Russell D Stormer
(74) *Attorney, Agent, or Firm*—Price, Heneveld, Cooper, DeWitt & Litton, LLP

(57) ABSTRACT

A vehicle wheel and overlay assembly having an overlay that extends radially outward to cover substantially the entire outboard surface of the wheel, without wrapping around the periphery of the wheel. The assembly includes a wheel having a flangeless or minimum functional flange height rim flange or alternatively a truncated rim flange that terminates in a flange lip having a radially outermost edge. An overlay is attached to and closely contours the wheel outboard surface and radially terminates in a peripheral flange that has a peripheral lip with a radially outermost edge that is aligned with the outermost edge of the wheel flange lip within a predetermined circumferential margin so that the peripheral flange covers at least a portion of the wheel flange lip. This configuration gives the visible impression that this is a one-piece wheel, where the outboard surface of the overlay appears to be the outboard surface of the wheel, and not a separate component.

11 Claims, 7 Drawing Sheets

U.S. PATENT DOCUMENTS

| | | | |
|---|---|---|---|
| 5,346,288 A | 9/1994 | Hodge et al. | |
| 5,358,313 A | 10/1994 | Polka | |
| 5,368,370 A * | 11/1994 | Beam | 301/37.36 |
| 5,435,631 A | 7/1995 | Maloney et al. | |
| 5,564,791 A * | 10/1996 | Chase et al. | 301/5.21 |
| 5,577,809 A * | 11/1996 | Chase | 301/37.43 |
| 5,595,423 A | 1/1997 | Heck et al. | |
| 5,597,213 A * | 1/1997 | Chase | 301/37.43 |
| RE35,497 E | 4/1997 | Carter, III | |
| 5,630,654 A | 5/1997 | Chase | |
| 5,636,906 A | 6/1997 | Chase | |
| 5,820,225 A | 10/1998 | Ferriss et al. | |
| 5,829,843 A | 11/1998 | Eikhoff | |
| 5,842,750 A | 12/1998 | Murray et al. | |
| 6,007,158 A * | 12/1999 | Maloney et al. | 301/37.43 |
| 6,068,350 A * | 5/2000 | Baumgarten et al. | 301/64.102 |
| 6,082,829 A | 7/2000 | Chase | |
| 6,200,411 B1 * | 3/2001 | Eikhoff et al. | 156/329 |
| 6,270,167 B1 * | 8/2001 | Kemmerer | 301/37.43 |
| 6,346,159 B1 * | 2/2002 | Chase et al. | 156/79 |
| 6,460,938 B1 * | 10/2002 | Baumgarten | 301/37.11 |
| 6,554,371 B2 * | 4/2003 | Maloney et al. | 301/37.43 |
| 2005/0179312 A1 * | 8/2005 | Hauler | 301/37.43 |

* cited by examiner

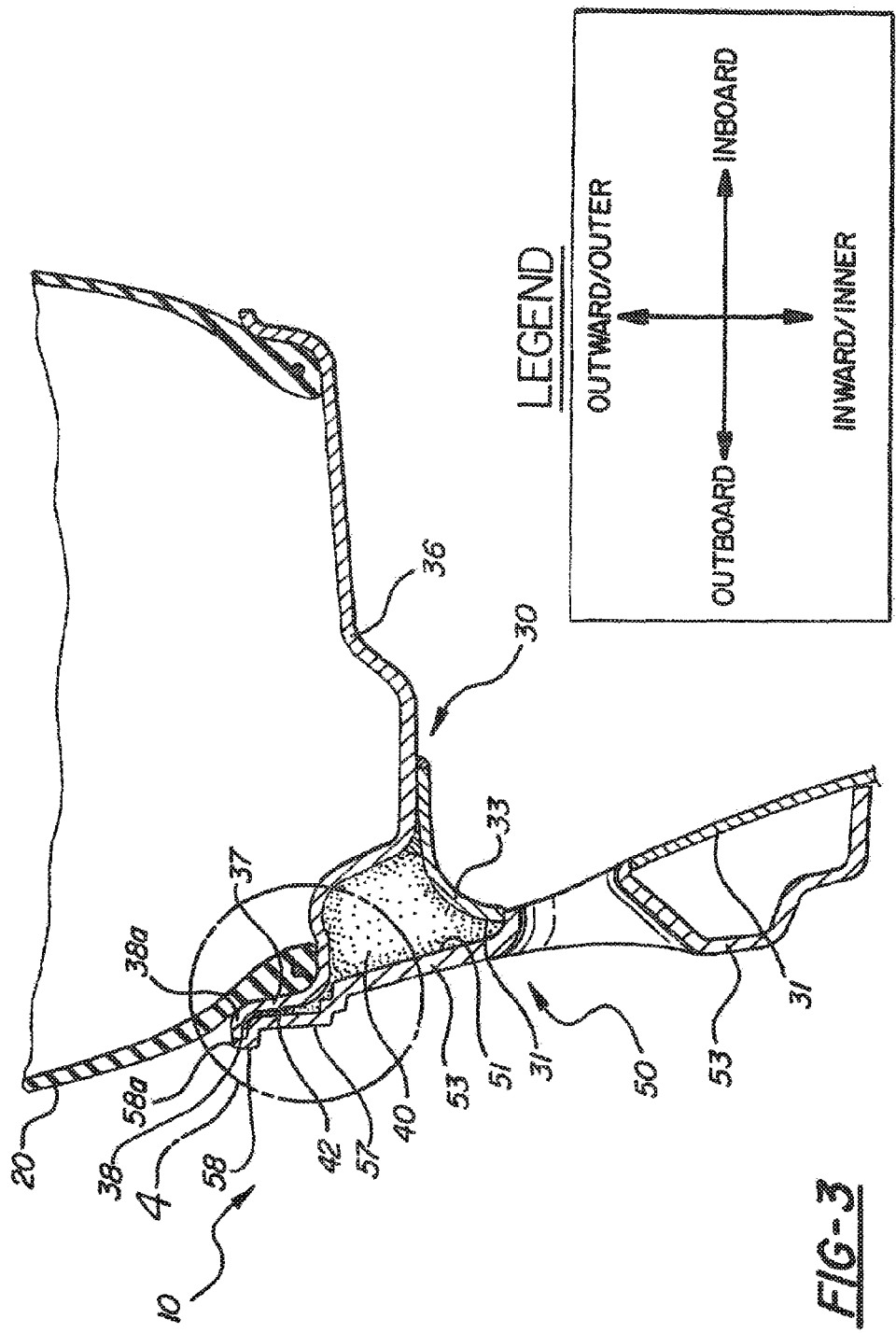

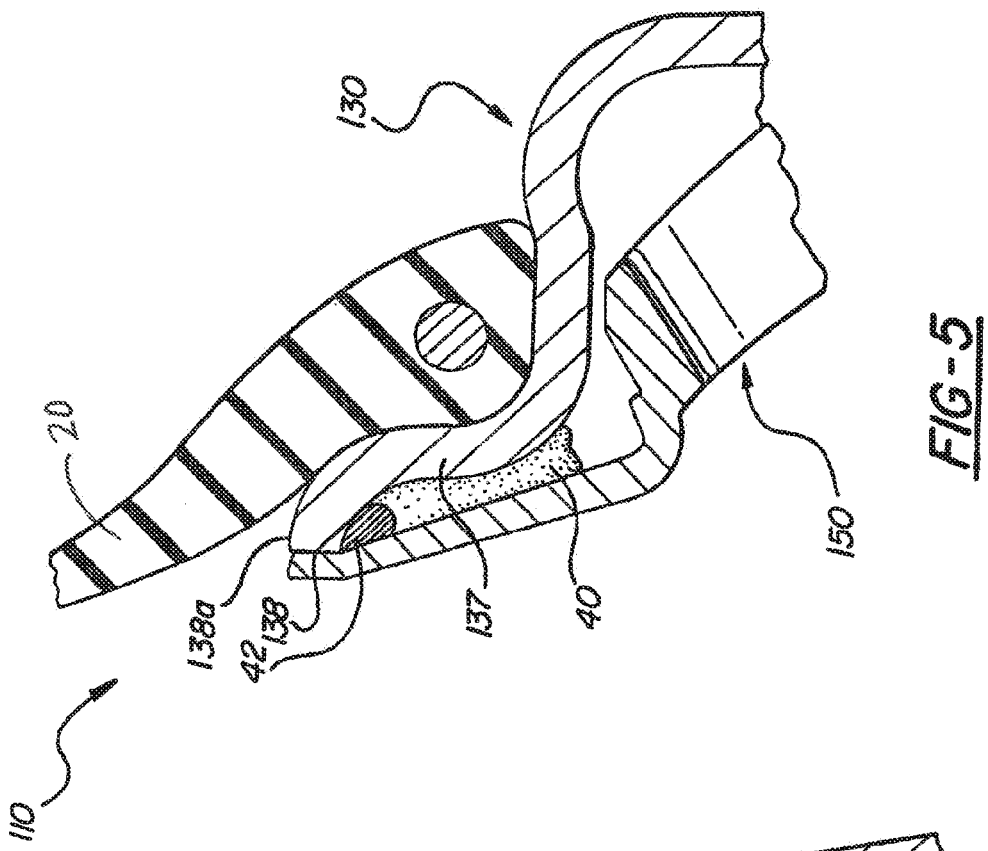
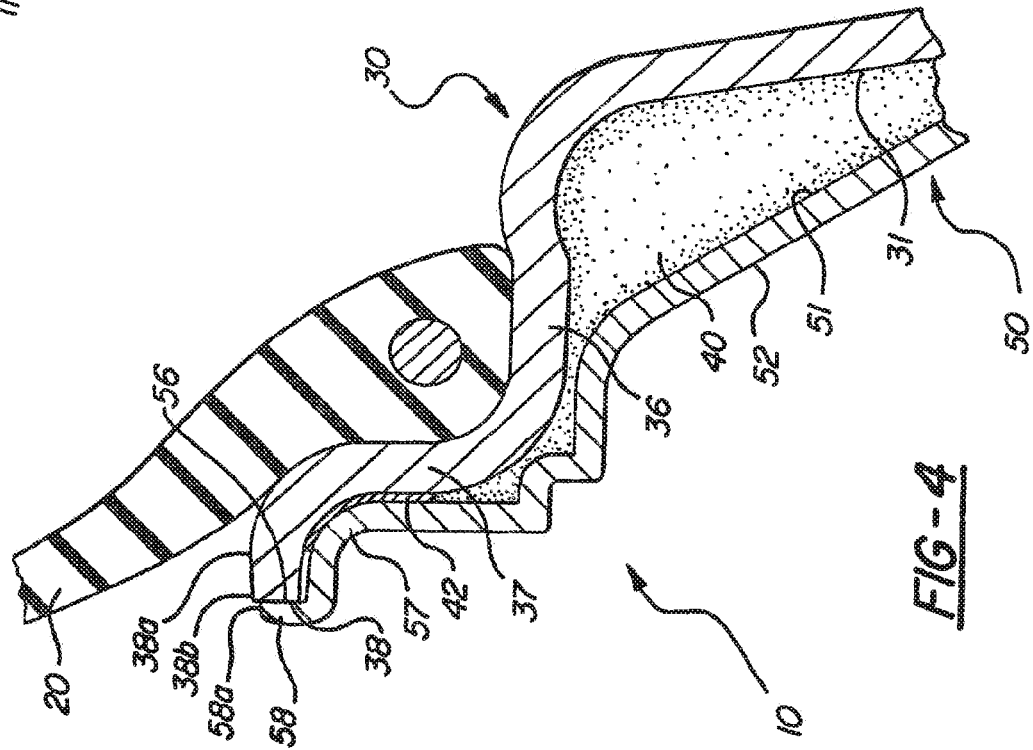

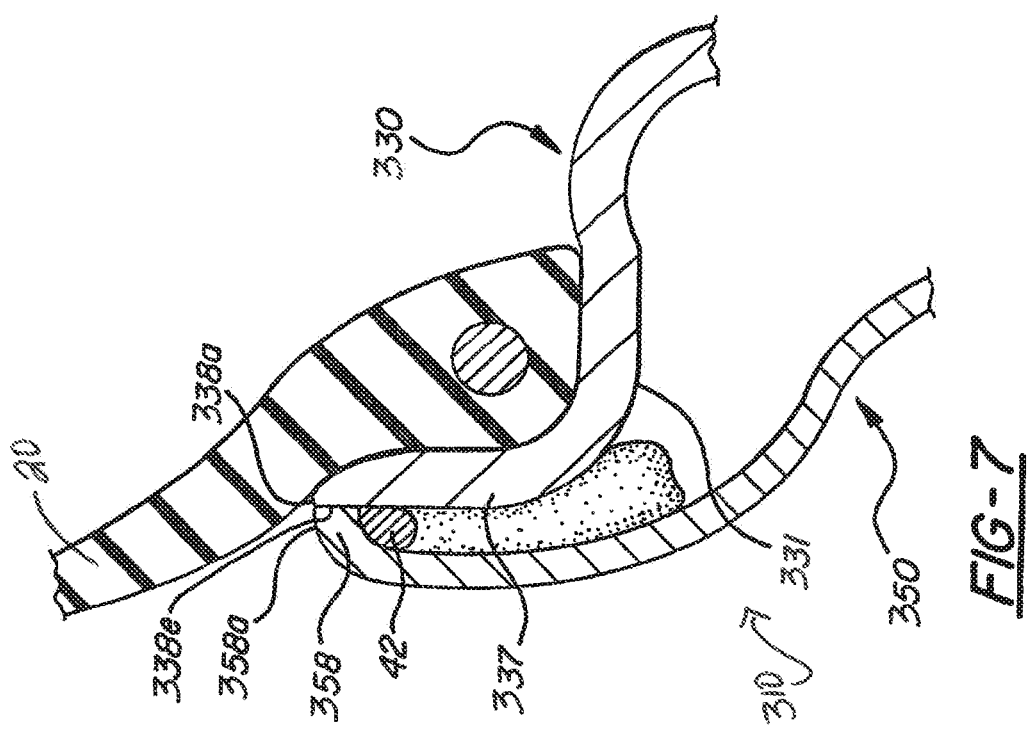
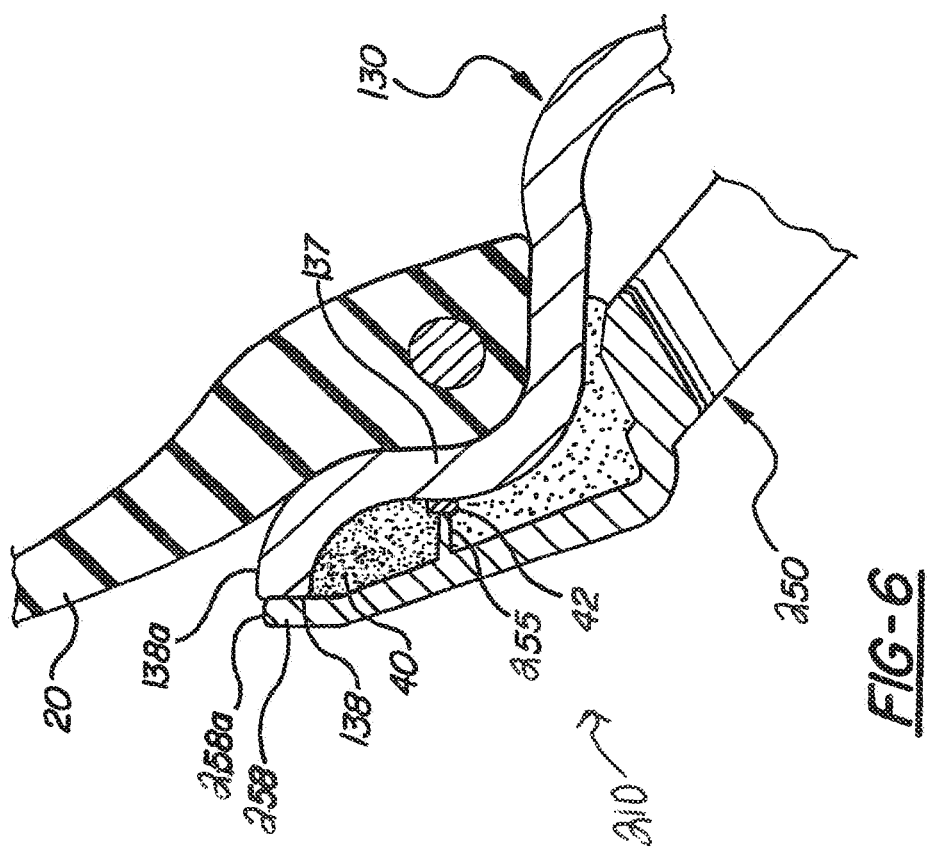

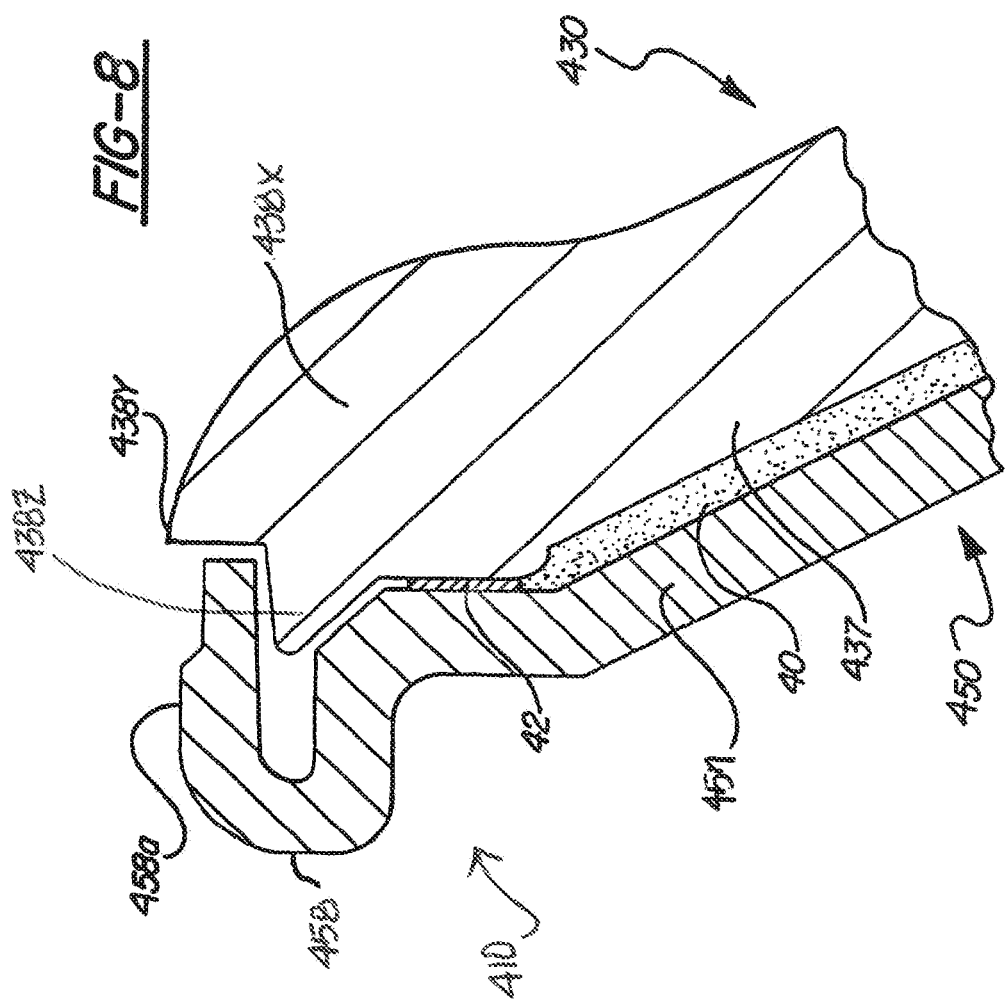

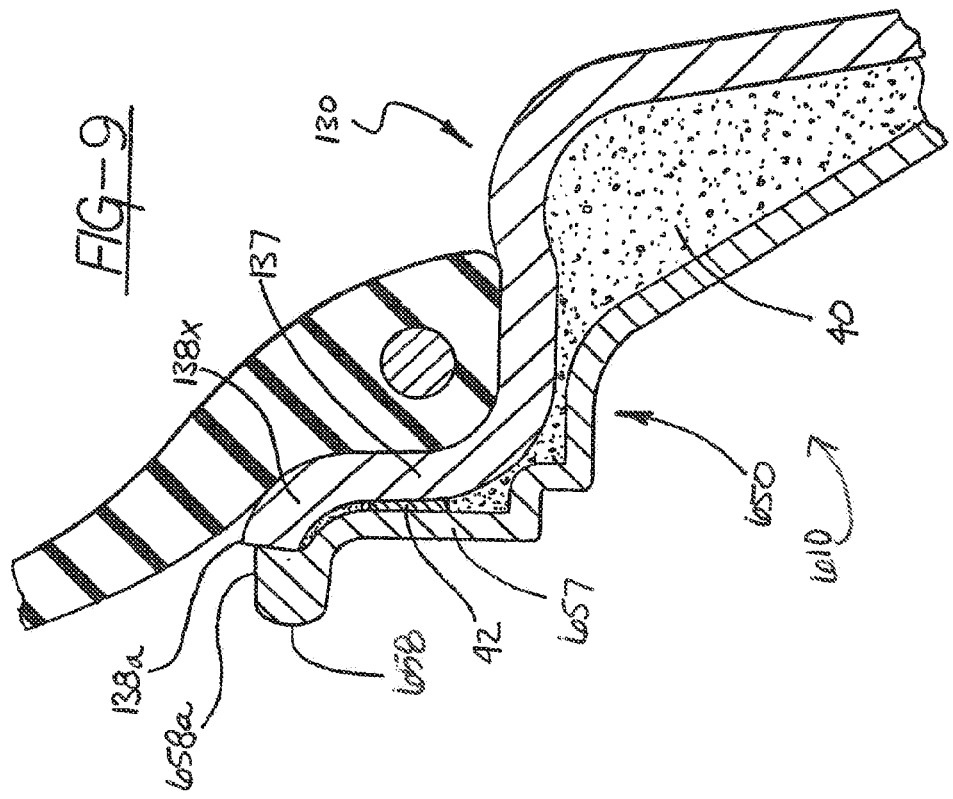
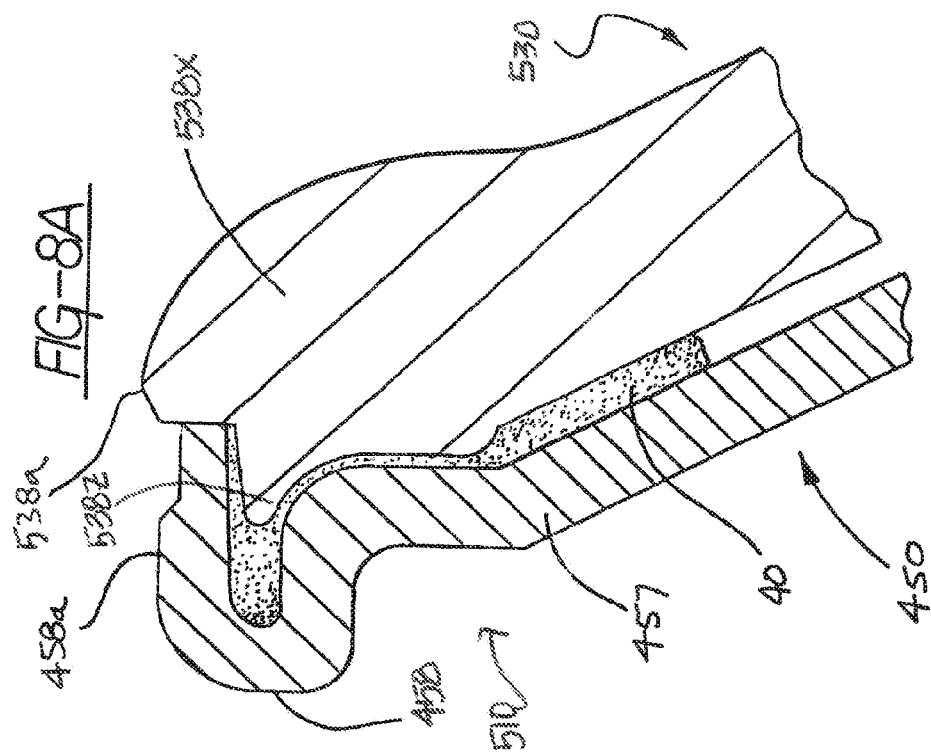

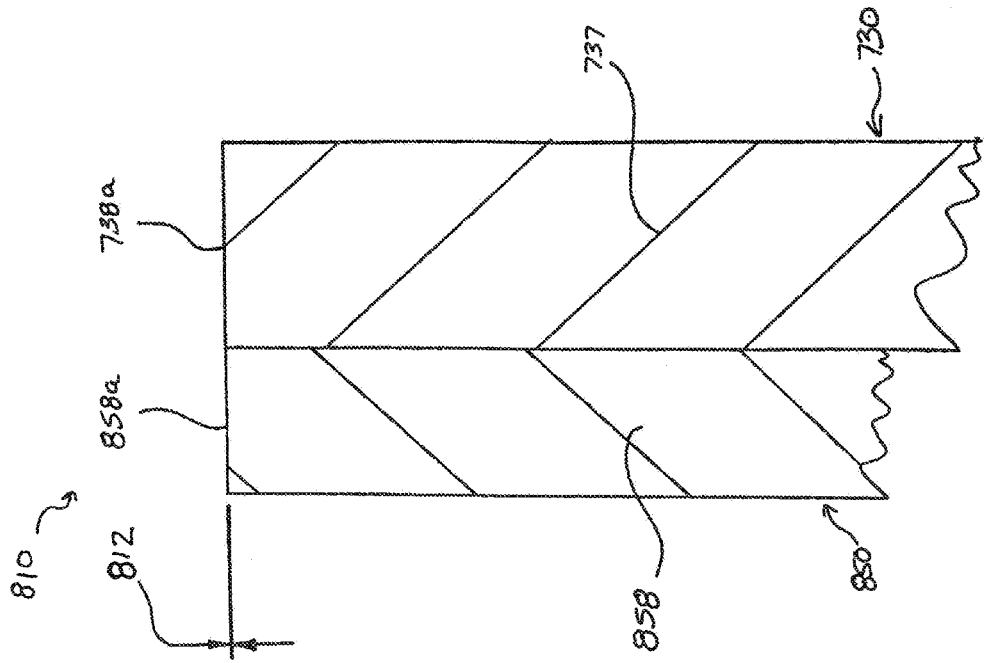
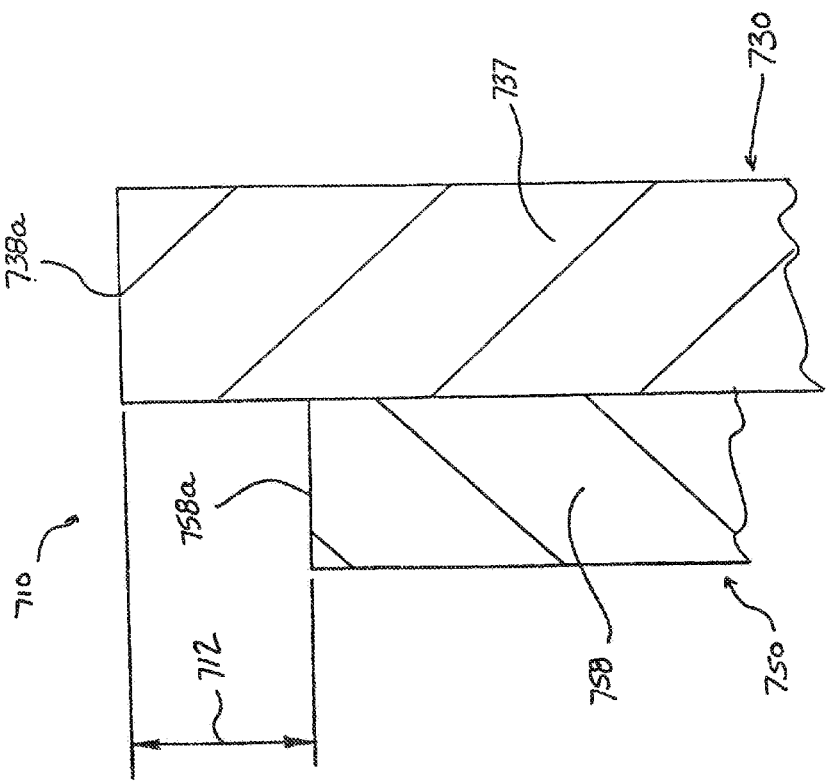

VEHICLE WHEEL RIM FLANGE AND OVERLAY ASSEMBLY

CROSS REFERENCE TO RELATED APPLICATION

This application is a continuation-in-part application of U.S. patent application Ser. No. 09/304,734 filed May 4, 1999, now abandoned, that was a non provisional application of provisional application Ser. No. 60/084,378 filed May 6, 1998.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to vehicle wheels that are equipped with an attached chromium-plated wheel cover, cladding or overlay. The metal plated overlay's bond strength permits the overlay to be shaped and contoured on to the shape of the wheel, so as to maximize aesthetic effects.

2. Description of the Related Art

Automotive vehicles often include substantial amounts of metal-plated trim elements that provide both decorative and functional features. These decorative elements are widely used to enhance the aesthetic appearance of automotive wheels. In addition, an overlay not only improves the appearance of unadorned standard steel wheels, but is also used with cast aluminum wheels, which are known to be expensive and difficult to plate with chromium. Below, numerous structural approaches for combining overlays with steel and/or cast wheels are described and divided into first and second groups of prior art.

In the first group, U.S. Pat. No. 5,636,906 to Chase, owned by the assignee hereof, teaches a decorative overlay to enhance the aesthetic appearance of an automotive wheel. The overlay described in the preferred embodiment is a metal-plated plastic panel that is adhesively attached to the outboard surface of the wheel disk and may radially extend to the flange lip of a typical rim flange complying with the tire and wheel association standards so as to cover the outboard surface in the rim flange area of the wheel. The overlay provides a pleasing aesthetic effect to the wheel. The overlay covers most of the wheel's outboard surface but does not extend radially outward to cover the edge or flange lip of the standard rim flange of the wheel. The base material composition and metal plating of the overlay permit the exterior surface of the overlay to be closely contoured to the outboard surface of the wheel, namely, the disk of the wheel and a major portion or all of the standard rim flange of the wheel. Further, the overlay resists delamination of the metal plating due to heat.

A further example of a vehicle wheel having a permanently secured wheel cover is disclosed in U.S. Pat. No. 5,368,370 to Beam. Here, a chrome-plated stainless steel cladding or wheel cover includes an outer peripheral edge that is forced into engagement with the wheel within a groove formed in a typical rim flange, complying with the tire and rim association standards, along the outboard surface of the wheel. This engagement locates and holds the wheel cover in place while the adhesive cures. Since the groove is machined in the rim flange axially inboard of the edge or flange lip of the rim flange the overlay extends outward to, but does not cover the lip of the standard rim flange of the wheel. Similarly, Maloney et al., U.S. Pat. No. 5,435,631, teach a wheel cover retention system, wherein the outboard tire bead seat retaining flange or standard rim flange of the wheel includes a groove as taught in Beam for securing the wheel cover to the wheel. Again, this overlay extends outward to, but does not cover the flange lip of the standard rim flange of the wheel.

Additionally, a wheel cover that extends outward to the flange lip of the standard rim flange of a wheel was a subject of a recently issued patent owned by the assignee hereof. Chase, U.S. Pat. No. 5,564,791, teaches an overlay that extends radially outward to—but not covering—the flange lip of the rim flange of the wheel. Furthermore, this overlay is configured with the wheel to enable a standard balance weight to be secured to the rim flange of the wheel.

Finally, U.S. Pat. No. 5,842,750 to Murray et al. teaches a composite styled wheel molded in situ having a mold-formed outer edge. Murray et al. disclose a urethane foam wheel cover molded in situ and permanently affixed to the outboard surface of a wheel, wherein the urethane material extends from fastener holes in the disk of the wheel radially outwardly to cover at least a portion of an outboard standard flange edge of the wheel. Murray et al. thereby teach eliminating the prior art requirement of trimming offal formed at an outboard flange edge of the wheel in a mutli-step cutting process that results in exposing an interior cellular construction of the urethane foam.

Unfortunately, there are several problems with using a molded in situ urethane cover for a wheel. First, urethane material molded in situ directly to the outboard surface of a wheel is susceptible to degradation in quality under localized high heat applications. Urethane material will tend to break down in localized high temperatures experienced in the wheel hub area of the wheel disk under certain actual road conditions. This is particularly true in the immediate region of the wheel hub where temperatures tend to be much higher than in the outer periphery of the wheel. Further, it is understood by those skilled in the art that one reason for spacing a plastic wheel cover from the outboard wheel surface is to avoid the deleterious effects of heat generated into the disk of the wheel by the brake system, that would otherwise distort or melt the plastic wheel cover and/or delaminate any surface treatment, i.e. paint, plating, etc., applied thereto. Second, those skilled in the art also appreciate that completely filling a wheel cavity with urethane is disadvantageous in that doing so does not readily permit limiting the degree to which the urethane fills the cavity causing localized inclusions affecting wheel weight, balance and fuel economy. In other words, in situ molding a wheel cover requires a relatively large volume of expensive urethane material. Third, an additional problem associated with the manufacturing method taught by Murray et al. is that a supply of wheels must be readily and continuously available to the manufacturer for molding of the wheel cover to the wheel, rendering a manufacturing process that is somewhat complicated, expensive, and reliant upon the continuous availability of wheels, which may be impractical for just-in-time manufacturing programs. Finally, and most significantly, the plastic foamed urethane overlay taught by Murray et al. dictates a variable thickness that is wedge-shaped in cross section at the standard outboard rim flange edge of the wheel. Accordingly, the radially outermost portion of the plastic urethane overlay will be extremely thin and therefore unreliable as extremely susceptible to chipping, thereby resulting in an unacceptable surface treatment aesthetically speaking.

In each of the above prior art references, it is evident that the overlay covers only most of the outboard face of the wheel and does not reliably cover the flange lip of the rim flange at the outer extremity of the standard rim flange. Accordingly, the exposed flange lip is susceptible to damage from stone chips resulting in bare metal exposed to the ambient elements i.e. salt, mud, water, etc. Additionally, the stainless steel overlay disclosed in both Beam and Maloney et al. is highly susceptible to visible "red rust" corrosion around the periphery. This is because, at the interface where the cover is mounted in the groove in the standard rim flange, galvanic action between the stainless steel overlay and a hot roll steel wheel can result in deposits of unattractive corrosion at the interface. Further, the exposed flange lip of the standard rim flange of the wheel circumscribing the periphery of the overlay is a clear manifestation that this is a cladded wheel and tends to make the wheel look smaller. This exposure of the flange lip of the standard rim flange completely fails to meet the objective; that is, to provide a visible impression to the consumer that this is a one-piece wheel, whereby the entire visible outboard surface of the overlay appears to be the entire outboard surface of the wheel, and not a separate attachment. Wheel and wheel cover tolerances may stack up to yield noticeable eccentricity between the wheel cover and wheel. For instance, where one arcuate sector of the wheel's outboard surface at the radially outer periphery of the wheel may be adequately covered by the wheel cover, an opposite arcuate sector may be insufficiently covered, thereby yielding an obvious nonsymmetrical appearance (not chrome plated) and a wheel cover/wheel assembly that is aesthetically unacceptable. Additionally, the exposed flange lip of the standard rim flange of the wheel along the radially outer periphery of the rim flange of the overlay also tends to make the wheel look smaller and less robust to the consumer. In contrast to this first group of prior art, the second group of prior art below addresses wheel trim that extends beyond the periphery of the flange lip of the standard rim flange of the wheel.

For example, Reppert, U.S. Pat. No. 4,275,931, and Bowling, U.S. Pat. No. 4,348,061, both teach a wheel trim ring that snaps onto the standard rim flange to extend beyond the flange lip of the rim flange. Similarly, U.S. Pat. No. Re. 35,497 to Carter, III teaches a retention system for a decorative simulated wheel cover wherein the wheel cover clearly extends radially beyond an outer peripheral edge of the standard rim flange of the wheel. Additionally, Polka, U.S. Pat. No. 5,358, 313, teaches an adjustable wheel liner for truck wheels wherein the cover extends well over the lip.

Todd, U.S. Pat. No. 5,143,426, teaches a standard vehicle wheel construction that eliminates the need to use an adhesive to secure a cover assembly to a wheel. Todd discloses that the cover assembly has a molded polystyrene base applied to an outboard surface of the wheel, with an ornamental thermoplastic fascia coat covering the base. The fascia coat is mechanically locked through the use of a mechanical interference with the periphery of the vent openings in the wheel to prevent separation of the wheel cover from the wheel. Todd also discloses that a peripheral edge of the fascia extends to an edge of the wheel, but does not disclose or teach any further detail for this feature. It is ambiguous from the drawings whether Todd discloses that the fascia extends to an axial edge or a radial edge of the wheel. In the perspective views of FIGS. 1 and 2, the fascia appears to extend to the axial edge of the wheel but beyond the radial edge of the wheel; whereas in the cross-sectional views of FIGS. 4a and 4b, the radial edge of the fascia appears to be in line with the radial edge of the wheel. Therefore, the disclosure of Todd is unclear as to exactly what is disclosed in regard to fascia overlap conditions with the underlying wheel's structural features.

Hodge et al., U.S. Pat. No. 5,346,288, teach a continuous cushioning member interposed laterally between a plastic wheel cover and a wheel, so as to avoid noise between the plastic cover and the steel wheel. Hodge et al. disclose that an outer peripheral portion of the cover overlies an outward turned flange portion of the wheel and is positioned in lateral proximity thereto. Like Todd, Hodge et al. does not provide sufficient disclosure with respect to the radially outer peripheral overlap of the cover to the underlying structural elements of the wheel. Because the overlapping relationships appear to be nearly co-diametrical but are nonetheless unclear, and because there is no disclosure to the contrary, it can only be reasonably presumed that the covers of Todd and Hodge et al. and the rim flanges of the wheel comply with the tire and wheel association standards.

An alternate approach to solving the problems of the first group of prior art involves not only extending the overlay beyond the radially outer periphery of the wheel, but actually wrapping the overlay around the flange lip of the standard rim flange of the wheel. For example, Beith, U.S. Pat. No. 3,726, 566, teaches that the edge of the cover is formed to grip over and around the edge of the standard terminal flange of the wheel, to aid in fixing the wheel cover to the wheel. Heck et al., U.S. Pat. No. 5,595,423, and Eikhoff, U.S. Pat. No. 5,829, 843, disclose similar teachings. Heck et al. disclose the use of a stainless steel overlay that covers at least a portion of the outboard facing disk of the wheel and the entire portion of the outer peripheral flange lip of the outboard bead seat retaining flange or standard rim flange. The overlay is preferably formed from stainless steel, is adhesively attached to the wheel, and has an appropriate decorative surface on its outboard side. This adhesive is applied on the outboard face of the wheel disk in a predetermined pattern, so that when the wheel cover is installed on the disk, a smearing of the adhesive occurs over substantially the entire outboard face of the disk. Since the adhesive covers substantially the entire interface between the wheel cover and the disk, it is effective to provide a seal and prevent water, mud, salt and other debris from entering between the wheel cover and the outboard surface of the wheel disk. At the outer peripheral edge of the standard rim flange facing the tire is a smooth, rounded outer peripheral end and a circumferential, radially outwardly facing groove. The peripheral end and the groove are both formed by machining operations to a predetermined specification. The groove is formed along the inboard side of the tire bead-seat retaining flange or standard rim flange. The outer peripheral end portion of the wheel cover is assembled to the smooth, rounded outer peripheral end of the wheel and terminates in the radially outwardly facing groove adjacent the rubber tire. However, this technology, like the prior art above, has several problems.

Accordingly, there is at least one unique problem with the Heck et al. '423 patent. For example, in assembling the wheel cover to the wheel, it is clear that overbend is required to accommodate the natural springback of the radial end of the stainless wheel cover. This overbend results in frictional engagement of the outer peripheral edge of the wheel cover with the smooth, rounded outer peripheral end of the wheel. This frictional engagement results in the removal of any form of protective coatings that may be on the wheel. Removal of the protective coating causes the wheel material to be in direct contact with the stainless overlay, and thereby detrimental galvanic action between the stainless steel cover and the rim flange will occur over time. There are more problems with this reference that are shared with the second group of prior art, and are described below.

The second group of prior art references address some of the concerns with the exposed flange lip of the standard rim flange existing in the first group of prior art references, but fails to address several other problems. Tire servicing, radial load deflections during operation, and "run flat" conditions are all situations in which permanent damage to the overlay or tire will occur. During tire installation and removal, service equipment that locates on the extreme periphery of the standard rim flange of the wheel will damage the prior art wheel covers that wrap around the flange lip of the rim flange. This will occur where the outermost diameter of the wheel cover is greater than that of the outermost diameter of the wheel, and could occur if the peripheral flange of the overlay is not located net against the flange lip of the standard rim flange of the wheel. Similarly, where the outside diameter of the wheel cover is greater than that of the wheel, it is likely that many wheel covers of the prior art would become damaged upon installation or removal of balance weights. Further, a larger diameter cladding is more likely to be cracked or chipped during a vehicle impact with a curb or a pothole, or as a result of material handling in the production process when outer diameters of assembled wheels collide into one another such as occurs on a gravity feed conveyor. Also, if a wheel and cladding assembly without a tire is rolled along a surface, the surface treatment of the cover (chrome plating) will chip since the cover wraps around the outside diameter of the wheel.

An additional problem with overlays which wrap around the rim flange is that the wheel and chrome plated overlay assembly appear to look larger relative to the width of the black rubber of a tire and therefore the overall aesthetics of the vehicle are affected. Wrapping the overlay around the standard rim flange of the wheel does indeed result in an overall diameter of the wheel assembly that is larger than the outer diameter of the wheel only. The only way to solve this problem is to reduce the outer diameter of the wheel before the overlay is attached to it so that when the overlay wraps around the standard rim flanges of a reduced diameter wheel the resulting assembly has the same diameter as the original design intent. Such solution is not tolerable since it affects the structural integrity of the wheel as well as significantly increases the costs of producing the wheel only.

Additionally, radial tire loads distort and deflect the standard rim flange area of the wheel during vehicle operation, as is known in the art. Because the prior art overlay actually wraps around the deflecting flange lip and standard rim flange, the deflections will in turn deflect the overlay resulting in cracking of the chromium plated surface layer. Further, these deflections of the overlay may cause the overlay's peripheral edge to become unseated from the groove or separate from the wheel. This is particularly a problem where the overlay's peripheral edge normally lies in a groove in the rim flange next to the rubber tire. There, the sharp unseated overlay edge may tear into the tire, causing severe damage.

The unseated or separated overlay poses a more likely risk under "run flat" conditions. Vehicles are sometimes run with flat tires for short distances until the tire can be serviced. Under these circumstances, the tire sidewalls distort outward over the standard rim flange of the wheel, and spin relative to the wheel. The sharp peripheral edge of an overlay wrapped around the flange lip of the standard rim flange of the wheel may tear into the rubber tire causing severe damage.

Consequently, what is needed is an overlay that covers the entire outboard surface of the wheel including a wheel where the rim flange has been reduced to a minimum functional flange height or truncated by machining and the overlay is assembled to the wheel without wrapping around the flange lip of the rim flange of the wheel so as to not affect the aesthetics of the vehicle. Such an overlay is appropriately retained with an adhesive to the outboard surface of the wheel, wherein the peripheral flange of the overlay is preferably net located against the minimum functional flange height rim flange, or alternatively against a machined wheel or truncated rim flange of the wheel. This configuration will seal the interface between the overlay and the wheel, and ensure overlay and tire integrity under all operating and service conditions of the wheel, including tire installation and removal, radial load deflections, and "run flat" conditions.

BRIEF SUMMARY OF THE INVENTION

According to the present invention, there is provided an overlay that is permanently secured to a wheel, where the overlay is brought radially outward to cover the entire outboard face of a wheel, including a truncated flange lip of the rim flange of the wheel without wrapping around the rim flange of the wheel. The present invention includes a wheel having an outboard surface defined by a disk, and a rim circumscribed about the disk. The rim's radial outer periphery (or the disk's outer periphery in the case of a full face wheel) is defined by a flangeless or minimum functional flange height rim or alternatively a truncated rim flange having a flange lip as the axially outermost edge. Additionally, the present invention includes an overlay that covers the entire outboard surface of the wheel including the flange lip of the rim flange. The overlay has an outboard surface with a web portion, and an integral peripheral flange which extends to the peripheral edge of the wheel in case of a flangeless or minimum functional flange height wheel rim circumscribed about the web portion. Further, the peripheral flange portion of the overlay also terminates in a flange lip as the radially outermost edge which covers a truncated or machined rim flange of the wheel. The peripheral flange portion of the overlay has an inboard surface that is near to the axially outermost edge of the rim flange of the wheel while the radially outermost edge or flange lip of the peripheral flange portion of the overlay is circumferentially aligned within a predetermined tolerance variation of the radially outer periphery of the rim flange of the wheel, such that the peripheral flange portion of the overlay covers the flangeless or minimum functional flange height wheel rim or alternative truncated flange lip of the rim flange of the wheel without wrapping over the edge of the wheel. This relationship gives a visible impression to the observer of the vehicle or wheel alone that the entire outboard surface of the overlay is actually the entire outboard surface of the wheel. This impression is accomplished without wrapping the overlay's peripheral flange portion around the flange lip of the standard rim flange, as with some previous prior art. The present invention also overcomes the disadvantages of other prior art in which the overlay extends up to, but does not cover the flange lip of the standard rim flange of the wheel.

For example, one advantage of the present invention is that the overlay protects the extremities of the flangeless or minimum functional flange height rim or alternative truncated flange lip of the rim flange of the wheel from stone chips. The overlay is made of a chrome-plated plastic material that is more resistant to stone chipping than the protective coating applied to the outboard surface of the wheel. Also, such complete coverage would conceal corrosion that may arise from galvanic action between some types of stainless steel overlays and the wheel. Further, having the overlay cover the entire wheel outboard surface creates the visible impression that the overlay outboard surface is actually the entire outboard surface of the wheel and not a separate attachment.

The present invention also overcomes disadvantages of other prior art in which the overlay wraps around the flange lip of the standard rim flange. The present invention has the advantage of providing the protection described above, yet doing so while avoiding potential damage to the overlay or the rubber tire. As mentioned above in the second group of prior art, the overlay must wrap around the standard rim flange into the tire bead seat area. Under certain driving or service conditions, the edge or flange lip of the overlay as well as the peripheral flange portion of the overlay may not be seated properly, and thus may present a sharp edge in the tire in the bead seat area of the wheel, potentially damaging the tire during the service life. The present invention avoids this risk because the flange lip of the peripheral flange portion of the overlay is maintained away from the tire bead seat area, yet still provides the pleasing aesthetic appearance described previously without the potential aesthetic misconception concerning the actual wheel diameter of the wheel as discussed above.

Another advantage of the present invention is that the overlay is less susceptible to damage during tire installation and removal. During such tire servicing activity, some service equipment must locate on the radially outer periphery of the rim flange of the wheel. In so doing, such equipment will damage the periphery of the prior art overlay since the overlay extends over the flange lip of the radially outer periphery of the standard rim flange of the wheel. However, the overlay of the present invention is not subject to this damage since its radially outermost edge is maintained just clear of the equipment during servicing.

Yet another advantage of the present invention is that it will not damage the tire under severe radial tire loads during operation of the vehicle. Severe radial tire loads deflect the rim flange area of the wheel. In turn, the overlay's peripheral flange portion will also deflect. Again, the peripheral edge of some prior art overlays wrap around the flange lip of the standard rim flange of the wheel and are rolled into a groove near the tire bead seat area. Under severe radial tire loads and associated deflections, the overlay's peripheral edge may unseat and present its sharp edge to the side of the tire, potentially causing severe damage by tearing into the rubber tire. The overlay's peripheral flange portion of the present invention is maintained outboard of this sensitive tire bead seat area, and thus will not pose this risk.

Similarly, another advantage is that the present invention will not damage the tire under "run flat" conditions. Under such conditions, the sharp edge of an unseated peripheral edge of the overlay in the tire bead seat area may tear into the flat tire, thus causing severe damage. Again, the overlay's peripheral rim flange of the present invention is maintained outboard of this sensitive area, and thus will not pose this risk.

It is an object and advantage that the present invention teaches a predetermined tolerance variation between the radially outermost diameters of the overlay and the wheel such that eccentricity conditions therebetween are carefully controlled to provide an aesthetically acceptable wheel and overlay assembly.

It is another object and advantage of the present invention that this predetermined tolerance variation provides a radial clearance between the outermost diameter of the wheel and the outermost diameter of the wheel cover so that the overlay as well as its chromium outer layer is not subject to damage by installation and removal of balance weights or tires as well as damage by diametrical impact with curbs, potholes, or other wheels during material handling.

Accordingly, it is an object of the present invention that the overlay sufficiently covers the outboard surface of the wheel such that the assembly visibly appears to be a one-piece construction and not two separately manufactured components.

It is another object of the present invention for the overlay to cover and thereby protect the flange lip of the rim flange of the wheel against stone chips and the display of corrosion, and to present a wheel assembly that is robust in appearance.

It is still another object of the present invention to provide an overlay and wheel assembly without wrapping the peripheral flange of the overlay around the flange lip of the rim flange of the wheel, so as to prevent any potential for tire damage that may result from an improperly seated peripheral edge of the overlay in the tire bead seat area of the wheel.

It is still a further object of the present invention to provide an overlay and wheel assembly where the actual diameter of the outboard surface of the wheel is not altered so as to appear larger such as those assemblies where the cladding or overlay wraps around the rim flange of the wheel or those assemblies where the cladding or overlay extends only up to the flange lip of the rim flange and does not cover the flange lip which gives a visual impression that the wheel diameter is smaller than the actual outer diameter of the wheel.

It is yet a further object of the invention to provide an overlay that has nearly the same outside diameter as the outside diameter of the wheel so as to avoid the visual impression that the wheel outside diameter is different, either smaller or larger, than what it actually is.

It is yet another object of the present invention that the overlay extends outward to circumferentially align with the outer periphery of the wheel so that standard balance weights are capable of being mounted thereto.

It is a further object of the present invention to provide the objects above with a low cost and easy to manufacture overlay.

Other objects and advantages of the present invention will be more apparent after a reading of the following detailed description taken in conjunction with the drawings provided.

BRIEF DESCRIPTION OF THE SEVERAL
VIEWS OF DRAWINGS

FIG. 3 illustrates a cross-sectional view of the vehicular wheel assembly of FIG. 2 taken along line 3-3 thereof;

FIG. 4 is an enlarged scale view of the rim flange area of the vehicular wheel assembly, designated by the circle 4 in FIG. 3;

FIG. 5 illustrates a cross-sectional view of the rim flange area of a "Euro" style flange with a truncated or machined lower minimum functional rim flange height and an overlay that terminates within a predetermined tolerance variation from the radially outer periphery of the wheel and locates net by abutting on the flange lip of the rim flange;

FIG. 6 illustrates a cross-sectional view of the rim flange area of a "Euro" style flange, similar to FIG. 5, wherein the overlay is net located on the flange lip of the truncated rim flange of the wheel and an offset integrally extends from an inboard face of the overlay;

FIG. 7 illustrates a cross-sectional view of the peripheral area of the rim area of a wheel similar to "Euro" style wherein the axially outboard extending portion of the rim flange of the wheel has been eliminated completely and only a minimum functional height rim flange is used and the overlay is bonded to an outboard face of the remaining portion of the rim or face of the wheel;

FIG. 8 illustrates a cross-sectional view of the rim flange area of a wheel wherein an axially outboard extending portion of the standard rim flange of the wheel has been machined and replaced by an overlay shaped in the form of an axially extending portion of the rim flange, and wherein the wheel cover is located net to a gasket located on the wheel;

FIG. 8A illustrates an alternative cross-sectional view of the rim flange area of FIG. 7 wherein the wheel cover is located net against the wheel;

FIG. 9 illustrates a cross-sectional view of the rim flange area of a wheel wherein an axially outboard extending portion of the rim flange of the wheel has been machined and replaced by an overlay shaped in the form of a wheel rim flange lip;

FIG. 10A illustrates a cross-sectional view of a flangeless or minimum functional flange height rim flange or alternative truncated rim flange area of a generic wheel and overlay assembly wherein a maximum circumferential margin is shown; and FIG. 10B illustrates a cross-sectional view of a flangeless or minimum functional flange height rim flange or alternative truncated rim flange area of a generic wheel and overlay assembly wherein a minimum circumferential margin is shown.

DETAILED DESCRIPTION OF THE INVENTION

Figure 1:
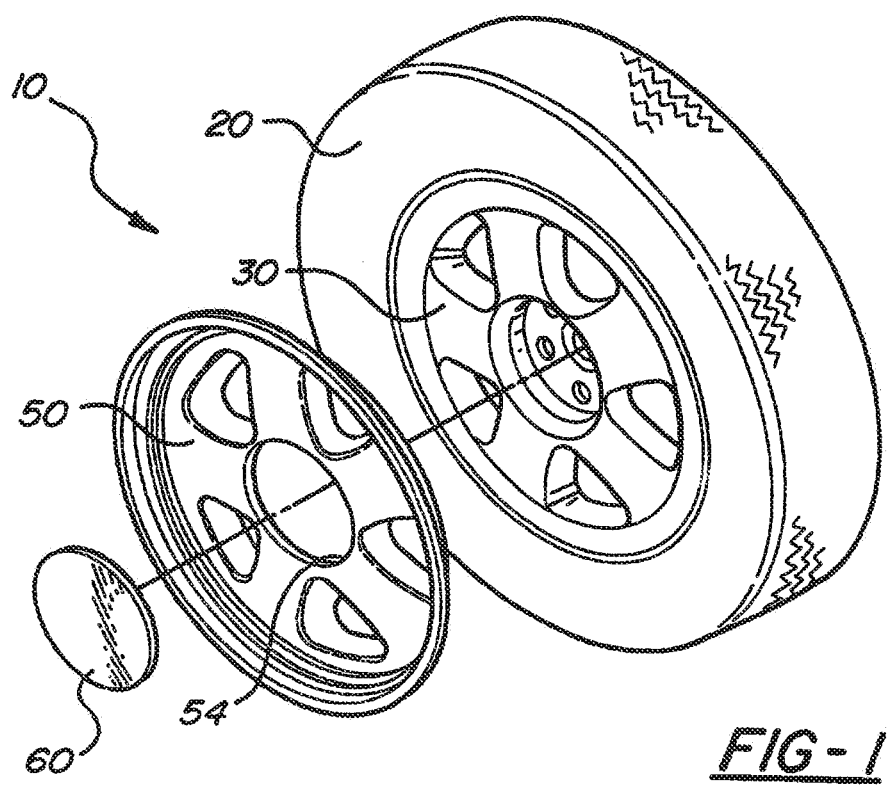
FIG. 1 illustrates an exploded perspective view of a vehicular wheel assembly including an overlay and a tire mounted to a wheel.
Figure 2:
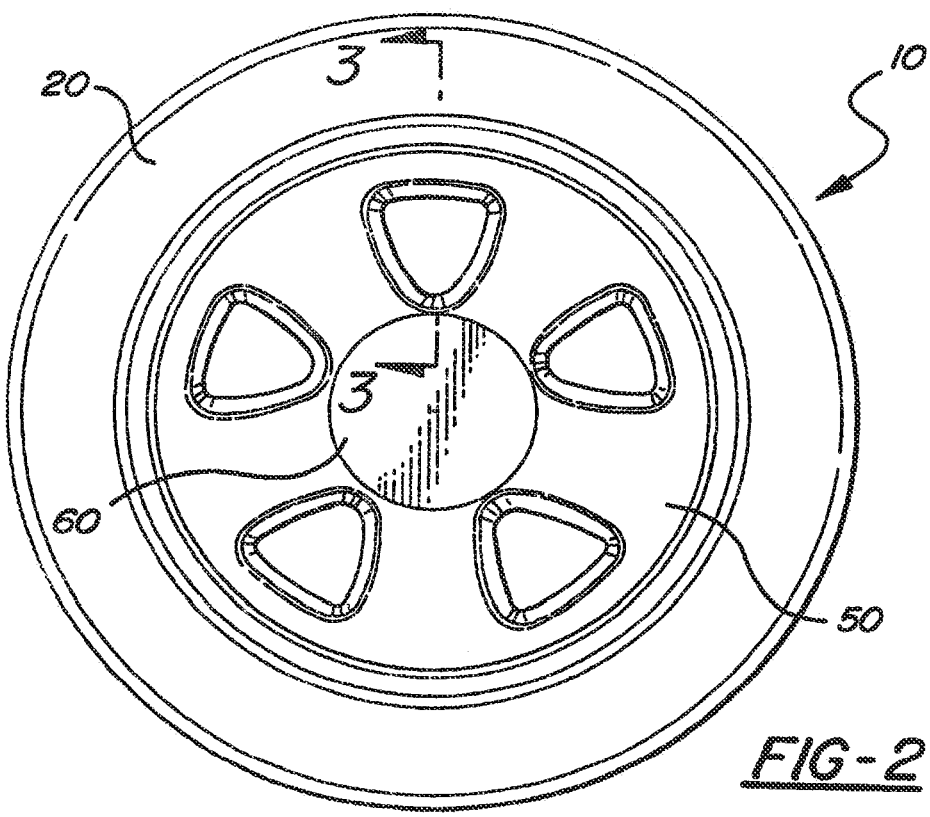
FIG. 2 illustrates a side view of the vehicular wheel assembly of the present invention.

Referring now to the drawings and with particular attention to FIGS. 1-3, there is illustrated in FIG. 1 an exploded perspective view of a vehicle cladded wheel assembly, indicated generally at 10, wherein the wheel may be constructed according to any one of the following well known wheel constructions: 1) a "bead seat attached wheel," such as shown in FIG. 4 of U.S. Pat. No. 5,188,429 to Heck et al.; 2) a "well attached wheel," such as shown in FIG. 3 of U.S. Pat. No. 5,188,429 to Heck et al.; 3) a one-piece cast or forged alloy wheel, such as shown in U.S. Pat. No. 5,636,906 to Chase; 4) a two-piece welded steel wheel, offset (drop center rim) as shown in FIG. 2 of U.S. Pat. No. 5,597,213 to Chase; 5) a partial rim and a full face, such as shown in FIG. 2 of U.S. Pat. No. 5,595,423 to Heck et al.; or 6) a "Euro" flange construction such as shown in U.S. Pat. No. 4,438,979 to Renz et al. Because of these various prior art wheel constructions, the Society of Automotive Engineers engineering nomenclature as published in SAE J1982 DEC91 and SAE J1986 FEB93 is adapted in the following description of the preferred embodiment, which follows.

Referring to the FIGS. 1 through 3 generally, according to the present invention there is provided a full or partial vehicle wheel cover or overlay 50 that is permanently secured to a vehicle wheel 30 using a semi-rigid polyurethane foam adhesive 40 as set forth in U.S. Pat. Nos. 5,636,906, 5,564,791, and 5,597,213, to Chase; U.S. patent application Ser. No. 09/184, 190 entitled "Vehicle Wheel Construction" to Chase, all owned by the common assignee hereof; and Heck et al., U.S. Pat. No. 5,595,423, all of which are incorporated by reference herein. According to the present invention the overlay 50 has been brought radially outwards to cover a flange lip 38 of a truncated machined rim flange 37 of the wheel 30 without extending radially beyond a radially outermost edge 38a of the rim flange 37 of the wheel and without wrapping around the flange lip 38. Furthermore, all of the embodiments apply equally well to a one-piece cast or forged alloy wheel, a bead seat attached wheel, a drop well-attached wheel, a wheel construction including a partial rim and full face wheel disk, among others; all of such prior art wheels are incorporated by reference herein.

FIG. 1 illustrates an exploded view of the vehicle cladded wheel assembly 10 that is constructed in accordance with the present invention. The present invention includes a wheel hub cover 60 that snaps into a central aperture 54 of the overlay 50 that in turn attaches to the wheel 30 upon which a tire 20 is mounted. As illustrated in FIG. 2, the vehicle cladded wheel assembly 10 appears to include only the wheel hub cover 60, the overlay 50, and the tire 20, when viewed from the outboard side. This provides the consumer with the visible impression that the overlay 50 actually is the wheel (not visible), and not a separate attachment.

Referring to the preferred embodiment of FIGS. 3 and 4, the vehicle cladded wheel assembly is illustrated including the tire 20 mounted to a rim 36 of the wheel 30. The rim 36 is circumscribed about a disk 33 and has a truncated rim flange 37 circumscribed about the rim 36 extending in a generally radially outward direction.

A person skilled in the art will recognize that these well defined distinctions become somewhat obscured where the wheel assembly is of the "full face" type, with the disk 33 extending integrally into the area of the rim to define a rim flange. However, the wheel illustrated in the figures is a two-piece welded construction (drop center rim) of the disk 33 welded to a rim. The truncated rim flange 37 extends in the generally axially outboard direction and, as shown in FIG. 4, has a radially outermost surface 38b defined by the radially outermost edge 38a. Finally, the wheel 30 has an outboard surface 31 consisting of the outboard portions of the disk 33, truncated rim flange 37, and the flange lip 38, to which the overlay 50 is attached.

The overlay 50 includes a rim flange 58 having a radially outermost lip or peripheral edge 58a with an inboard surface 56 that is net located against the flange lip 38 of the wheel 30. An adhesive or sealant bead 42 and the adhesive 40 take up any axial tolerance variations between an inboard surface 51 of the overlay and the outboard surface 31 of the wheel. The adhesive 40 is preferably a selectively deposited adhesive but can also be a foam adhesive as described above. A portion of the overlay 50 is thereby kept spaced away from the wheel 30 by the sealant bead 42, and the overlay 50 is permanently attached to the wheel 30 using the foam adhesive 40 located between the outboard surface 31 of the wheel 30 and the inboard surface 51 of the overlay 50. The sealant bead 42 may be composed of a quick-cure, moisture-cure, or an ultraviolet-cure urethane, silicone, or the like. The overlay 50 is made of a thin gauge panel and includes a peripheral flange portion 57 circumscribed integrally about a web portion 53.

The peripheral flange portion 57 terminates in a radially outer direction in the rim flange 58 with the radially outermost lip or peripheral edge 58a, as shown in FIG. 4. In accordance with the present invention, generally the radially outermost lip or peripheral edge 58a of the overlay 50 does not extend beyond the radially outermost edge 38a of the wheel 30, as also illustrated in the side view of the vehicle cladded wheel assembly 10 of FIG. 2. Note that the rim flange 58 of the overlay 50 is located net to the flange lip 38 of the wheel 30, such that the radially outermost lip or peripheral edge 58a covers a major portion of the flange lip 38 but does not extend radially therebeyond. Accordingly, the overall outside diameter of the overlay 50 does not exceed the overall outside diameter of the wheel 30 such that the overall diameters may at most be exactly co-diametrical, but preferably, there should be a circumferential margin between the overall diameter of the overlay 50 and the overall diameter of the wheel 30. In other words, the radially outermost lip or peripheral edge 58a of the overlay 50 is preferably aligned with the radially outermost edge 38a of the wheel 30 such that there is a slight radial offset therebetween. This offset or circumferential margin can encompass any dimension so long as the radially outermost lip or peripheral edge 58a of the rim flange 58 covers a major portion of the flange lip 38, but preferably, the circumferential margin is 1.2 to 1.5 mm per side with a tolerance of +/−0.8 mm. Alternatively, the circumferential margin can be specified as 0 mm per side with a unilateral tolerance of −1.6 mm. Thus, the circumferential margin is so slight that it is not readily noticeable to a consumer looking at a wheel assembly when the wheels are installed on a vehicle. This results in an extremely close covering configuration that gives a consumer a visible impression that an entire overlay outboard surface 52 not only conceals the wheel 30, but actually is the wheel 30 and prevents the visual impression that the wheel is smaller or larger than its design intent. Finally, the overlay 50 may include a paint finish, a plated finish, or no finish at all.

More specifically, FIG. 4 illustrates an enlarged view of the composite vehicle cladded wheel assembly 10 of FIG. 3, wherein the outermost surface 38b of the truncated rim flange 37 as well as the flange lip 38 of the wheel 30 is machined to a predetermined dimension. The radially outermost lip or peripheral edge 58a of the overlay 50 is aligned to the outermost surface 38b of the flange lip 38 of the wheel 30 so as to cover at least a major portion of the flange lip 38 and associated wheel 30. Furthermore, the composite dimensional height and width of the overlay 50 and the truncated rim flange 37 of the wheel 30 define standardized dimensions that will meet attachment requirements for standardized wheel balance weights (not shown). As mentioned above, the inboard surface 56 of the rim flange 58 is located net to the flange lip 38 of the wheel, and a portion of the overlay 50 is spaced away from the wheel 30 by the adhesive/sealant bead 42 between the wheel's outboard surface 31 and the overlay 50. The adhesive/sealant bead 42 and the foam adhesive 40 can be utilized as a means for accommodating the tolerance variations between the overlay 50 and outboard surface 31 of the wheel 30. However, the primary purpose of the adhesive/sealant bead 42 is to prevent squeaking or noise which may result from the overlay 50 rubbing against the wheel 30. Any appropriate foam adhesive 40, or combinations of adhesives, placed between the overlay 50 and the wheel 30 securely maintains the overlay 50 to the wheel 30 during the service life of the composite vehicle cladded wheel assembly 10.

Another vehicle cladded wheel assembly 10 is illustrated in FIG. 5 representing a "Euro" styled look, as a variation of FIG. 4. This Euro look is typified by a shorter rim flange 37, wherein an overlay 150 radially terminates at a radially outermost edge 138a of a wheel 130 as well as axially net locates against a flange lip 138. In addition to the adhesive/sealant bead 42, the foam adhesive 40 is located between the overlay 150 and the wheel 130. This configuration creates a seal such that when the foam adhesive 40 is used between the overlay 150 and the wheel 130, appropriate sealing is obtained during the time required to cure the foam adhesive 40. Other sealing arrangements are contemplated within the scope of the invention. The Euro flange is prevalent in Europe and does not accept clip or balance weights (not shown) attached to the rim flange of the wheel 130. Instead, weights are generally taped to the radially inner face of the wheel (not shown).

The embodiment of FIG. 6 is a cladded wheel assembly 210 that is another variation of FIG. 4 and also depicts a Euro type flange as set forth above in FIG. 5. An overlay 250 is located on the wheel 30 by an offset 255 attached to the inboard side of the overlay 250. The offset 255 is spaced away from the wheel 130 by the adhesive/sealant bead 42. As discussed previously, the overlay 250 extends radially outwardly to cover at least a portion of the flange lip 38 (138) but does not extend beyond the radially outermost edge 138a of the wheel 130. However, any space between the overlay 250 and the flange lip 138 of the wheel 130 may be sealed by the foam adhesive 40 between the overlay 250 and wheel 130 either near a radially outermost lip or peripheral edge 258a of the overlay 250 or radially inward thereof. The seal prevents water, dirt or mud from entering the space between the overlay 250 and the wheel 130.

Another embodiment of the proposed invention of a cladded wheel assembly 310 as shown in FIG. 7 illustrates a cross section of a wheel 330 similar to the newly developed Pneu Accrohage (PAV-vertically anchored tire) by Michelin, wherein the traditional flange lip and rim flange of the wheel 330 has been modified to be a minimum functional flange height. Unlike the rim flanges of the previous embodiments, a rim flange 337 of this embodiment has no axially outboard extending flange lip. Rather, the rim flange 337 of this embodiment terminates in a flange lip 338 that continues from the minimum functional flange height rim flange 337 in a generally radially outward direction and has a radially outermost edge 338a. As before, the radially outermost lip or peripheral edge 358a of the rim flange 358 of the overlay 350 extends as far as, but no further than, the radially outermost edge 338a of the wheel flange lip 338 so as to provide a visible impression that the decorative layer completely covers an outboard surface 331 of the wheel 330 to the outer periphery thereof without detrimental aesthetic effects. As with all of the embodiments of the present invention, it is preferable that a circumferential margin be present between the overall diameter of the overlay 350 and the overall diameter of the wheel 330 because of the concentricity tolerance variations between the outer diameters of the wheel and the overlay. Again, an adhesive/sealant bead 42 is placed between the overlay 350 and the wheel 330 to prevent squeaking or noise. Since the embodiment of FIG. 7 depicts a wheel 330 without the traditional flange lip, such configuration would not comply with the standard Tire and Rim Association standard dimensions as well as nomenclature.

Yet another embodiment of the proposed invention of a cladded wheel assembly 410, as shown in FIG. 8, is similar to that of FIG. 7. FIG. 8 also illustrates a cross section of a wheel 430 wherein the traditional flange lip of the wheel 430 has been modified by machining. A rim flange 437 of this embodiment does not terminate in an axially outboard extending flange lip as with prior embodiments. Rather, the rim flange 437 of this embodiment is truncated before it would blend with a flange lip 438X that would be integral with the rim flange 437 in a generally radially outward direction and has a radially outermost edge 438Y and an axial protrusion 438Z underlying the flange lip 458 of the overlay. Accordingly, a radially outermost lip or peripheral edge 458a of the overlay 450 extends as far as, but no further than, the radially outermost edge 438Y of the wheel flange lip 438X so as to provide a visible impression that the vehicle wheel cladding assembly 410 incorporates the traditional flange lip, in this case on the overlay 450 instead of the wheel 430. As in other embodiments, the decorative layer gives the visual impression that it completely covers an outerboard surface 431 of the wheel 430 to the outer periphery thereof, However, unlike the embodiment of FIG. 7, here a peripheral flange portion 457 of the overlay 450 is formed relative to the wheel rim flange 437 to present the flange lip 458 on the overlay 450 in such a way as to resemble the traditional wheel rim flange lip. Consequently, a standard balance weight (not shown) may be attached entirely to the peripheral flange portion 457 and flange lip 458 of the overlay 450, and not attached to a traditional rim flange of the wheel illustrated in FIGS. 1-6. The radially outermost lip or peripheral edge 458a of the flange lip 458 is relieved at its diametrical outermost edge, as shown, to accommodate and retain the locking tab found on most balance weights. Additionally, the overlay 450 net locates to the wheel 430 via the sealant gasket or bead 42. In the alternative cladded wheel assembly 510, as shown in FIG. 8A, the flange lip 458 of the overlay 450 can net locate directly against a flange lip 538X of the wheel 530, using the sealant gasket 42 as shown in FIG. 8 as well as an adhesive 40 to take up the tolerance variation therebetween and permanently mount the overlay 450 to the wheel 530.

Finally, FIG. 9 illustrates another cladded wheel assembly 610 that is a further variation on FIGS. 8 and 8A, wherein a flange lip 658 of an overlay 650 is formed relative to the truncated rim flange 137 of the wheel in such a way as to resemble the traditional flange lip of the rim flange of a wheel. Consequently, a standard balance weight (not shown) may be attached only to a peripheral flange portion 657 and flange lip 658 of the overlay 650, and not attached to the rim flange 137 and/or flange lip 138 of the wheel 130. Here, the inboard surface of the flange lip 658 of the overlay 650 net locates against the flange lip 138 of the wheel 130, wherein the sealant bead 42 seals the overlay and wheel while the adhesive takes up dimensional variation between the overlay 650 and wheel 130 and adheres the overlay 650 to the wheel 130. Note that the adhesive 40 is disposed radially inward and outward of the sealant bead 42. Accordingly, the adhesive aids in securing the outer periphery of the overlay 650 to the outer periphery of the wheel 130 and thereby aids in distributing stress loads therebetween. The portion of the adhesive 40 that is radially outward of the sealant bead 42 can be a different type of adhesive than the portion that is radially inward of the sealant bead 42.

The unique configuration of FIG. 9 has several specific advantages. First, a standard wheel balance weight can more easily be assembled to the wheel assembly because the flange lip 658 is relatively narrower than the width of the flange lip 658 and flange lip 138X combined. Second, since the axially shorter flange lip 138X of this Euro style wheel is less prominent, the axially longer flange lip 658 of the overlay 650 provides the more prominent feature of prior art wheel designs, with a cost savings and lower overall weight due to the shorter metal flange lip being replaced with plastic material. The result is an enhancement of the overall appearance of the wheel assembly since the overlay 650 would further resemble the wheel 130 itself rather than a separately attached component.

FIGS. 10A and 10B generally illustrate in enlarged view the circumferential margin discussed extensively above. FIG. 10A most clearly illustrates an enlarged view of a wheel and overlay assembly 710 having a maximum circumferential margin 712. The circumferential margin 712 is defined between a radially outermost edge 738a of a rim flange 737 of a wheel 730 and a radially outermost edge 758a of a flange lip 758 of an overlay 750. Similarly, FIG. 10B illustrates an enlarged view of a wheel and overlay assembly 810 having a minimum circumferential margin 812. Again, the circumferential margin 812 is defined between the radially outermost edge 738a of the rim flange 737 of the wheel 730 and a radially outermost edge 858a of a flange lip 858 of an overlay 850. As shown in FIGS. 10A and 10B, the circumferential margins 712 and 812 are representative of all of the circumferential margins referred to previously with regard to all of the other figures.

As set forth above and according to the present invention, the wheel assembly incorporates the overlay that is permanently secured to the outboard surface of the wheel, wherein the overlay extends radially outward to cover a major portion of the flange lip of a flangeless or minimum functional flange height rim or alternative truncated machined rim flange of a wheel but does not extend beyond the radially outermost edge of the rim flange of the wheel, such that the overlay appears to be the actual wheel diameter and not a separate attachment. As a result, any decorative finish such as chrome plating or heat resistant paint on the overlay appears to be formed on the wheel itself. This is particularly advantageous with hard to plate wheel materials, such as cast aluminum. Accordingly, optimization of the wheel's design and styling can be achieved independent of plating or paint limitations. Other limitations are overcome by the present invention and are discussed below.

The present invention is an optimum solution to the two basic problems of the prior art. First, the present invention provides an aesthetically pleasing overlay that completely or at least substantially covers the outboard surface of the wheel without detrimental aesthetic perceptions due to the overlay wrapping around the rim flange or stopping short of the flange lip of the standard rim flange of the wheel. Secondly, the overlay does not compromise the integrity of the tire by intruding into the tire area of the wheel.

Whereas the first group of prior art wheels provides an overlay that covers most of the wheel outboard surface, the present invention goes further to provide complete or substantially complete coverage. By completely covering the wheel outboard surface, several advantages are realized: 1) the overlay provides protection against stone chipping of the rim flange and flange lip of the wheel; 2) coverage to the extreme periphery of the rim conceals underlying corrosion that arises from galvanic action between some types of overlays and wheels; 3) coverage to the extreme periphery of the rim gives the impression that the assembly consists of just the wheel itself and not two separately manufactured components, and 4) further gives the impression of a larger, more robust wheel.

Furthermore, the second group of prior art wheels involves risks associated with wrapping the peripheral lip of the overlay around the standard rim flange of the wheel. Wrapping the overlay around the standard rim flange of the wheel potentially subjects the overlay to damage resulting from tire service equipment, and potentially presents the sharp edge of the overlay into the tire seat area of the wheel, under tire radial load or "run flat" conditions. The present invention avoids these risks by design. First, the present invention aligns the radially outermost edge of the overlay with the radially outermost edge of the wheel within a certain tolerance range such that the overall diameter of the overlay cannot exceed the overall diameter of the wheel, thereby maintaining the overlay out of the way of service equipment. Second, the present invention consequently maintains the sharp radially outermost edge of the overlay outboard of the tire seat area of the wheel, thereby eliminating the potential risk of damage to the tire.

While the invention has been described in terms of a preferred embodiment, it is apparent that other forms could be adopted by one skilled in the art. Accordingly, the scope of the invention is to be limited only by the following claims.

What is claimed is:

1. A wheel and overlay cladding assembly comprising:
   wheel having an outboard surface defined by
      a disk portion;
      a rim portion circumscribing said disk portion; and
      means for attaching said rim portion to said disk portion;
      said rim portion having a minimum functional flange height rim flange terminating in a radially extending flange lip defining an outside diameter of said rim portion and including a radially outermost edge;
      an axial protrusion extending axially outward from said rim portion and radially spaced from said radially outermost edge of said flange lip;
      said disk portion, rim portion and flange lip defining said outboard surface of said wheel;
   an overlay having:
      an outboard surface juxtaposed said outboard surface of said wheel;
      an inboard surface complementary to said outboard surface of said wheel;
      a web portion and a peripheral flange portion terminating in a peripheral lip, said peripheral lip having a terminal edge defining a thickness between said inboard and said outboard surface, said terminal edge thickness facing said outboard surface of said wheel when said overlay is attached to said wheel; and
      means for attaching said overlay to said wheel, said attaching means disposed between said outboard surface of said wheel and said inboard surface of said overlay, said means for attaching said overlay to said wheel comprising at least one permanent adhesive disposed between said outboard surface of said wheel and said inboard surface of said overlay for permanently securing said overlay to said wheel;
      said outboard surface of said overlay defining an outer diameter of said overlay smaller by a predetermined margin than said outside diameter defined by said radially extended flange lip of said minimum functional flange height rim flange of said wheel regardless of tolerance variation of said overlay and said wheel;
      whereby said overlay gives a visible impression that said outboard surface of said overlay is actually said outboard surface of said wheel and not a separately attached component of said wheel and overlay assembly and further whereby damage to the overlay is reduced by tire changing equipment that mounts on the extreme periphery of the standard rim flange of the wheel or material handling of said wheel assembly during production and/or transportation of said assembly will prevent said cladding from damage by adjacent assemblies contacting each other.

2. The wheel and overlay assembly as claimed in claim 1, wherein said predetermined margin is about 1.2 to 1.5 millimeters having a bilateral tolerance of about 0.8 millimeters.

3. The wheel and overlay assembly as claimed in claim 2, wherein said outer diameter of said overlay is substantially equal to said outside diameter of said wheel within a predetermined margin of 0.2 millimeters having a unilateral tolerance of about 1.6 millimeters.

4. The wheel and overlay assembly as claimed in claim 1, wherein said overlay is spaced away from said wheel by an adhesive/sealant bead means and attached to said wheel with a selectively deposited adhesive.

5. The wheel and overlay assembly as claimed in claim 1, wherein said overlay further comprises:
   at least one offset integral with said inboard surface of said overlay, said at least one offset locating said overlay relative to said rim flange of said wheel.

6. The wheel and overlay assembly as claimed in claim 4, wherein said adhesive is an adhesive means comprising a bead adhesive along the outside diameter a foam adhesive filling the space between said outside surface of said wheel and inboard surface of said overlay.

7. The wheel and overlay assembly as claimed in claim 1, wherein said overlay includes a heat-resistance metal-plated finish.

8. The wheel and overlay assembly as claimed in claim 1, wherein said overlay includes a heat-resistant paint finish.

9. The wheel and overlay assembly as claimed in claim 1, wherein said overlay includes a weatherable material with no finish applied thereto.

10. The wheel and overlay assembly as claimed in claim 1, wherein said wheel is composed of a metal material.

11. The wheel and overlay assembly as claimed in claim 1, wherein said peripheral flange portion of said overlay and said rim flange of said wheel combine to define industry standard dimensions that meet attachment requirements for industry standard wheel balance weights.

* * * * *